United States Patent

Cardona

[11] Patent Number: 6,149,359
[45] Date of Patent: Nov. 21, 2000

[54] RETRACTABLE WHEELCHAIR ANCHOR

[75] Inventor: Edgardo Cardona, Atchison, Kans.

[73] Assignee: Kinedyne Corporation, North Branch, N.J.

[21] Appl. No.: 09/524,376

[22] Filed: Mar. 13, 2000

[51] Int. Cl.[7] .................................................. B60P 7/08
[52] U.S. Cl. ................................. 410/11; 410/3; 410/4; 410/7; 410/8; 410/18; 410/23; 410/104; 410/105; 410/111; 296/65.04
[58] Field of Search ................................ 410/3, 4, 7–11, 410/18, 19, 21–23, 51, 104, 105, 107, 111; 296/65.04; 248/503.1; 297/DIG. 4; 280/304.1

[56] References Cited

U.S. PATENT DOCUMENTS

| 4,103,934 | 8/1978 | Arnholt et al. | 410/7 X |
|---|---|---|---|
| 4,772,164 | 9/1988 | McFarland | 410/3 |
| 5,344,265 | 9/1994 | Ullman et al. | 410/3 |
| 5,489,170 | 2/1996 | Inoue et al. | 410/7 |
| 5,567,095 | 10/1996 | James et al. | 410/7 |
| 5,823,724 | 10/1998 | Lee | 410/104 |
| 5,888,038 | 3/1999 | Ditch et al. | 410/7 |

Primary Examiner—Stephen T. Gordon
Attorney, Agent, or Firm—Young & Basile, P.C.

[57] ABSTRACT

A wheelchair anchor for use in a vehicle is movable between a retracted position in which it takes up a relatively small amount of floor space within the vehicle and an extended position in which it provides a plurality of anchor points to which one or more wheelchairs may be secured. An elongated track plate is secured to the floor of the vehicle so that it extends transversely to the direction of vehicle motion, and a beam assembly made up of three beams telescopingly engaged with one another is slidable along the track plate between a retracted position adjacent a first end of the track plate and an extended position wherein the beam is slid toward the opposite, second and the track plate. The distal end of the beam assembly is securable to the track plate adjacent the midportion of the track to maintain the beam assembly in the retracted position adjacent the first end of the track, and is alternatively securable to the track adjacent the second end to maintain the beam assembly in the extended position. Mounting brackets are disposed on the different segments of the beam assembly so that when the beams are in the extended position the brackets are spaced from one another to allow wheelchair restraint straps to be connected to the brackets.

18 Claims, 4 Drawing Sheets

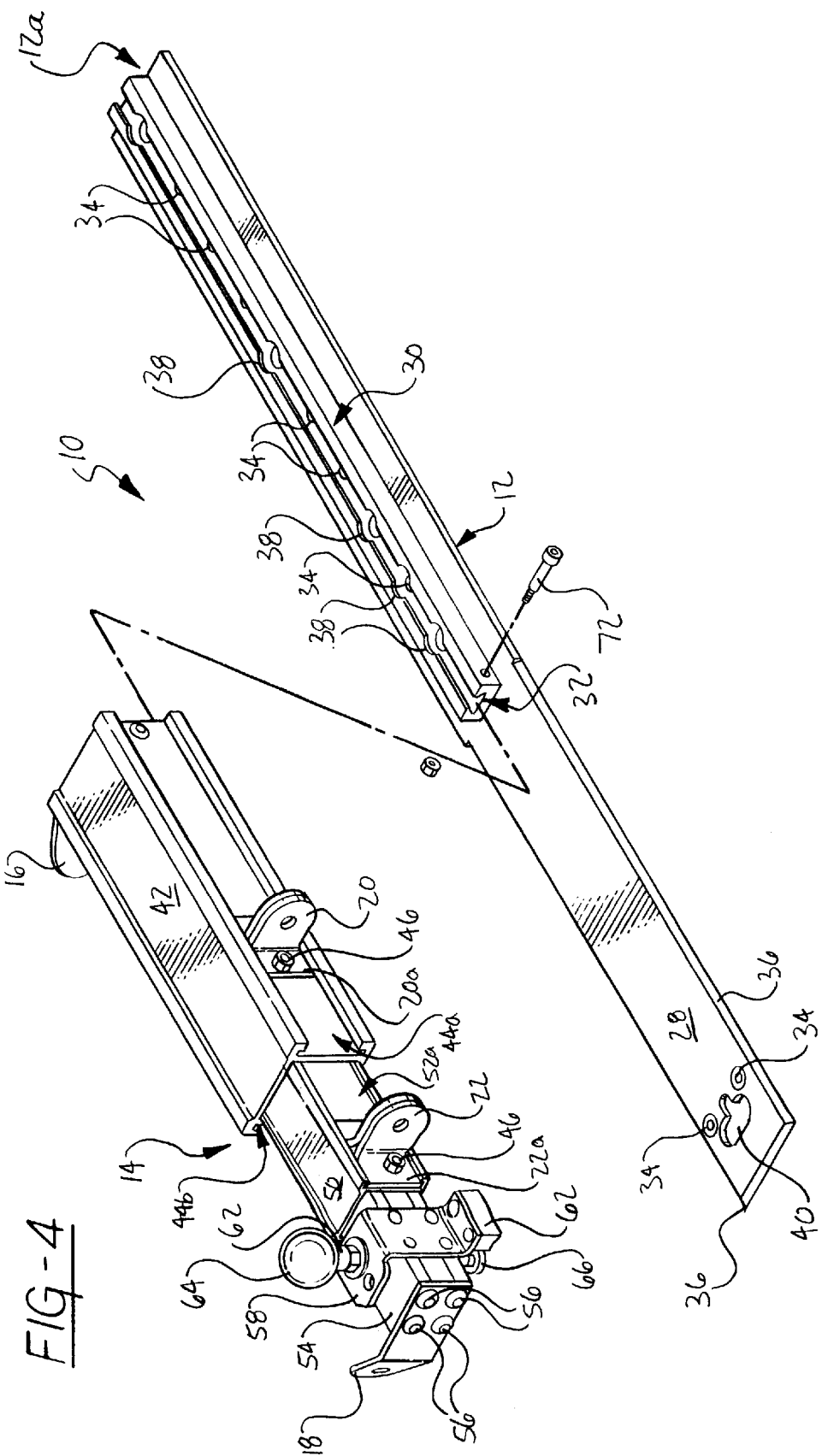

RETRACTABLE WHEELCHAIR ANCHOR

FIELD OF THE INVENTION

This invention relates to apparatus for securing an occupied wheelchair inside the passenger compartment of a vehicle such as a van, bus or train.

BACKGROUND OF THE INVENTION

It is often necessary for persons using wheelchairs to travel by vehicles such as vans, buses or trains. It is important for the safety of the wheelchair occupant and other persons in the vehicle that the wheelchair be securely restrained within the vehicle at all times when the vehicle is in motion. Most commonly, the wheelchair is secured in place by flexible straps which engage the wheelchair frame and extend both forwardly and rearwardly from the chair to engage anchor points disposed on the floor and/or walls of the vehicle.

When the vehicle in question is used for public transportation, it is desirable that the anchors do not prevent the space in the vehicle from being used for other passengers when no wheelchair is being carried. It is also desirable that the anchors do not obstruct movement of the wheelchair into or out of position.

SUMMARY OF THE INVENTION

The invention provides a wheelchair anchor for use in a vehicle and which is movable between a retracted position in which it takes up a relatively small amount of floor space within the vehicle and an extended position in which it provides a plurality of anchor points to which one or more wheelchairs may be secured. In the retracted position, the anchor offers a minimum of obstruction to wheeling the wheelchair into and out of position with respect to the anchor.

According to the invention, the anchor comprises an elongated track plate and a beam assembly made up of three beams telescopingly engaged with one another. The track plate is bolted or otherwise secured to the floor of the vehicle so that it extends transversely to the direction of vehicle motion, and a first of the beams engages the track plate and is slidable therealong between a retracted position adjacent a first end of the track plate and an extended position wherein the beam is slid toward the opposite, second and the track plate. The second beam is slidingly engaged with the first beam for movement parallel to the longitudinal axis, and the third beam is slidingly engaged with the second beam for movement parallel to the longitudinal axis.

The end of the third beam distal from the second beam is securable to the track plate at a first location adjacent the midportion of the track to maintain the first, second and third beams in their respective retracted positions adjacent the first end of the track. The distal end of the third beam is alternatively securable to the track at a second location adjacent the second end of the track to maintain the first, second and third beams in their respective extended positions. Mounting brackets are disposed on the first beam and the third beam so that when the beams are in the extended position the brackets are spaced from one another to allow wheelchair restraint straps to be connected to the brackets.

The anchor is secured within the vehicle with the first end of the track plate adjacent a vehicle wall. In the retracted position, the three beams are all adjacent the first end of the track plate so that they extend only a short distance outwardly from the vehicle wall. This is the stored position of the anchor when it is not in use. To prepare the anchor for use, the distal end of the third beam is disengaged from the track plate and all three beams are pulled toward the second end of the track plate, telescoping outwardly from one another, and the distal end of the third beam is then engaged with the track plate adjacent its second end.

According to the preferred embodiment of the invention disclosed herein, a third mounting bracket is disposed on the first beam and a fourth mounting bracket is disposed on the second beam. When in the extended position, the third and fourth mounting brackets are spaced from one another to allow a second set of wheelchair restraint straps to extend to a second wheelchair positioned on an opposite side of the anchor.

Also in the preferred embodiment, the first beam is a hollow tubular section so that the second beam slides inside its hollow interior in the retracted position, and the second beam is also a hollow tubular section so that the third beam may slide into its hollow interior. A retractable stud is disposed at the distal end of the third beam and projects through the third beam to engage holes in the track plate at the first and second locations.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4 is a partially exploded perspective view;

FIG. 5 is a cross section view taken along line 5—5 of FIG. 1; and

FIG. 6 is cross sectional view taken along line 6—6 of FIG. 2.

DESCRIPTION OF THE PREFERRED EMBODIMENT

Figure 1:
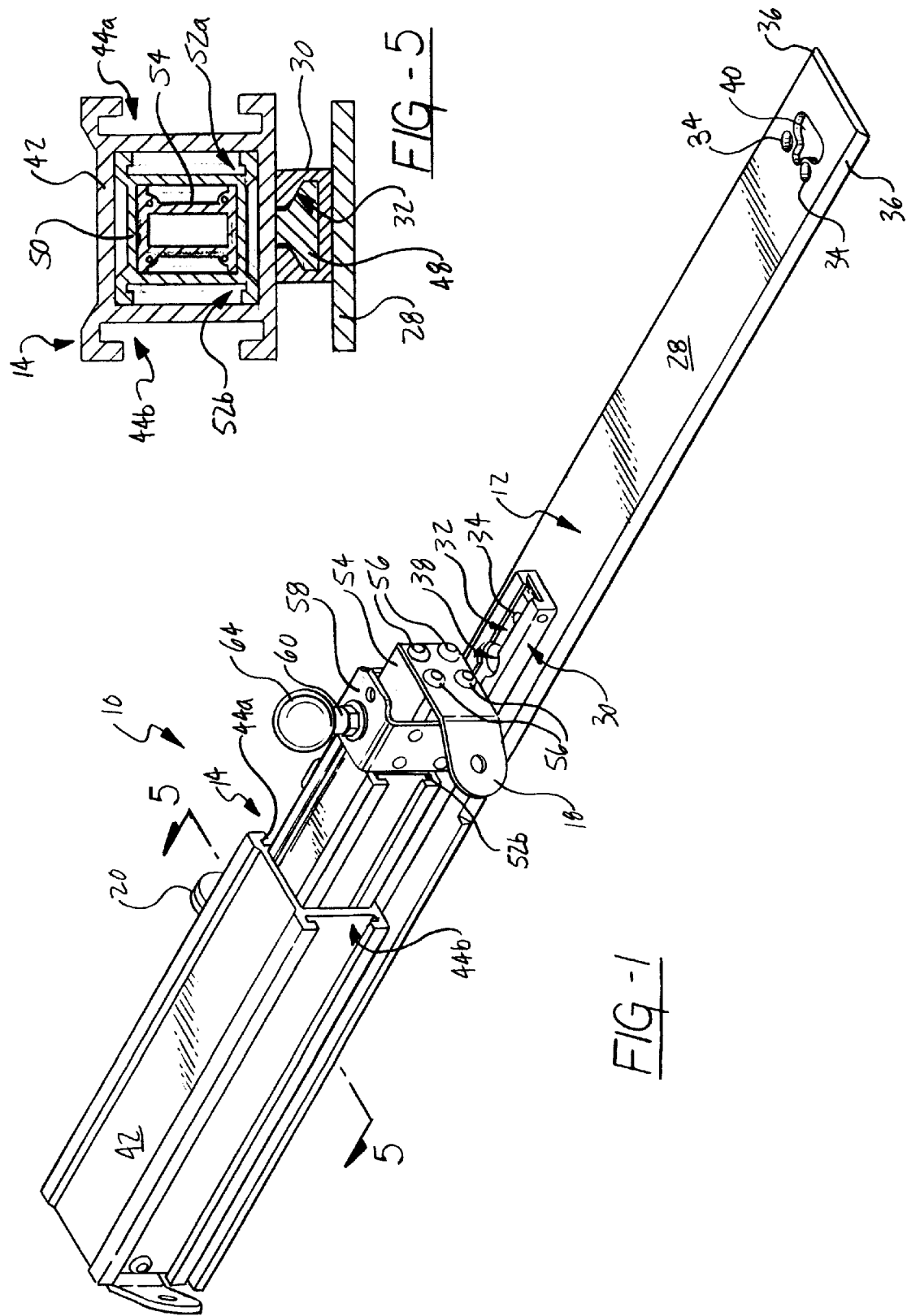
FIG. 1 is a perspective view of an anchor according to the present invention in a fully retracted position.
Figure 2:
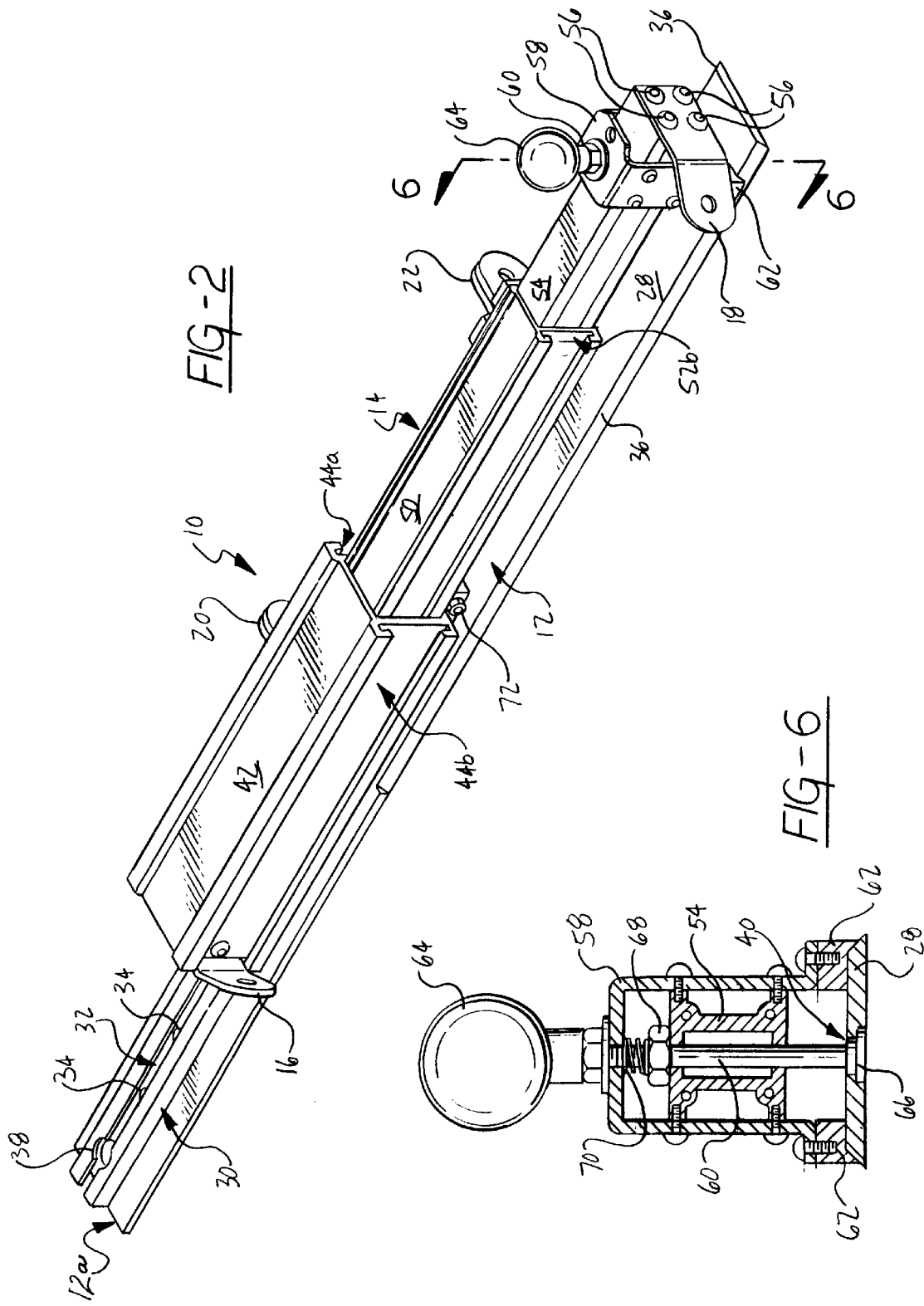
FIG. 2 is a perspective view of the anchor in a fully extended position.
Figure 3:
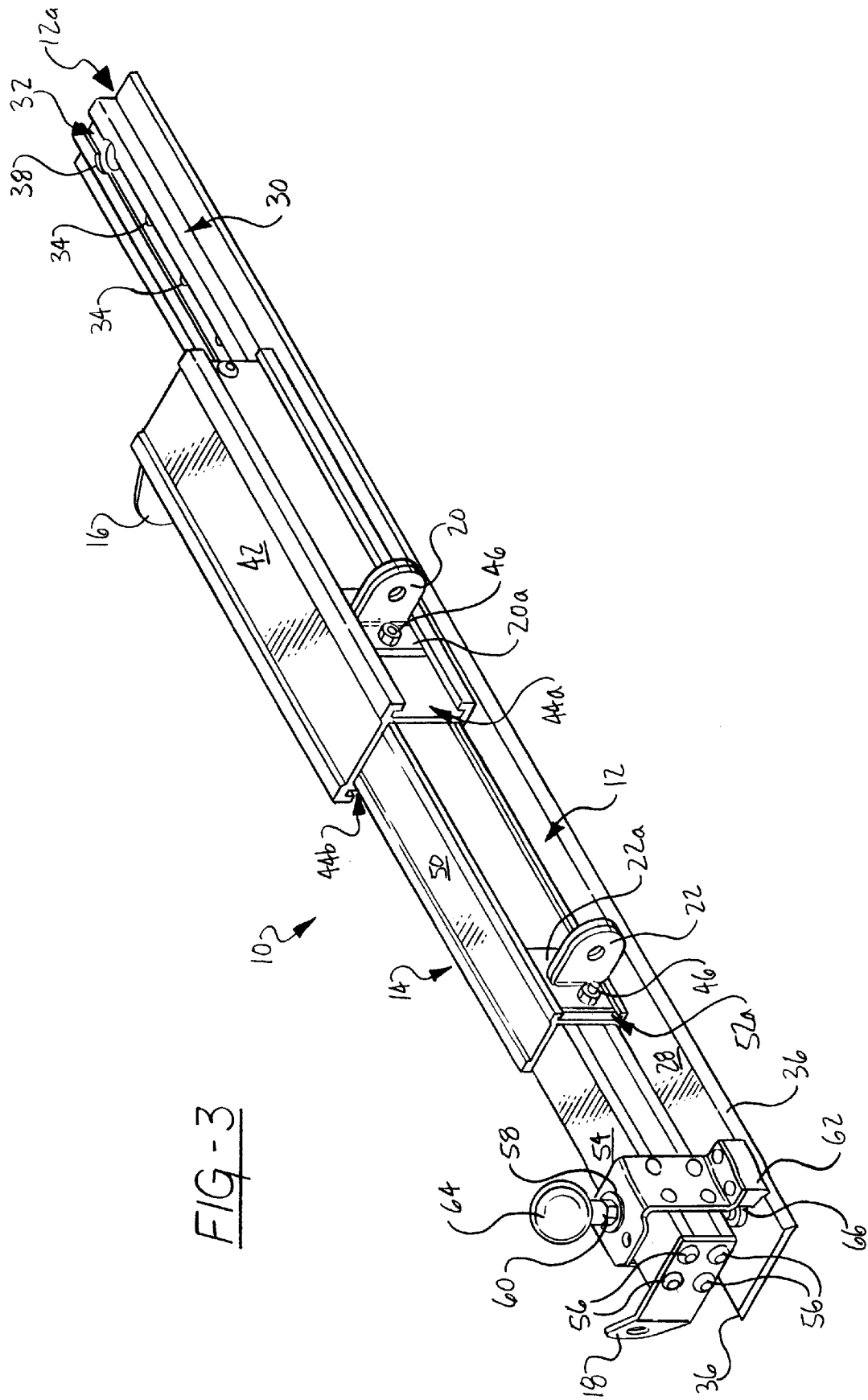
FIG. 3 is a perspective view of the anchor in the extended position of FIG. 2 showing the opposite side.

As seen in FIGS. 1–6, a retractable anchor 10 according to the present invention comprises an elongated track plate 12 and a beam assembly 14 slidingly engaged with the upper surface of the track plate for movement between a retracted position (shown in FIG. 1) and an extended position (shown in FIGS. 2 and 3). The invention anchor 10 is intended for mounting within a passenger compartment of a vehicle (not shown) with the longitudinal axis of track plate 12 extending transversely to the direction of vehicle travel. A pair of front mounting brackets 16,18 are disposed on one side of anchor 10 and a pair of rear mounting brackets 20,22 are disposed on the opposite side of the anchor to provide attachment points for restraint straps (not shown) extending to wheelchairs (not shown) positioned on either side of anchor 10.

Track plate 12 comprises a generally flat, elongated metal floor plate 28 having a raised track 30 extending along the upper surface thereof and extending from a first end 12a of the track plate to the midportion of the track plate. Track 30 has a reverse-chamfered interior race 32. A plurality of bolt holes 34 are formed in track plate 12 along its length for receiving fasteners to secure the track plate 12 to the vehicle floor. Bevels 36 are formed along both lateral edges of floor plate 28 adjacent the second end thereof. As best seen in FIG. 4, a plurality of stud receiving holes 38 are disposed at spaced locations along the length of track 30. A stop hole 40 is formed adjacent the second end of plate 12.

The first beam 42 is a hollow, tubular section having C-shaped channels 44a,44b extending along opposite surfaces thereof. First beam 42 is preferably formed of a high-strength aluminum alloy by an extrusion process. Front mounting bracket 16 is secured to a first end of first beam 42 by bolts (not visible in the figures) or other appropriate fastening means. Rear mounting bracket 20 has a flat base 20a which slides into C-channel 44a on one side of first beam 42 and is secured in place by bolts 46 or other appropriate fastening means. At least one track engagement member 48 protects downwardly from the lower surface of first beam 42 (see FIG. 5). Track engagement member 48 has a flared lower end which fits into track race 32 to maintain first beam 42 in sliding engagement with track 30.

The second beam 50 is a tubular member having C-shaped channels 52a,52b extending along opposite surfaces thereof. Rear mounting bracket 22 has a flat base 22a which slides into C-channel 52 on the same side of second beam 50 as bracket 20, and is secured in place by bolts 46 or other appropriate fastening means. The outer dimensions of second beam 50 are such that it is able to fit into the hollow interior of first beam 42 (as best seen in FIG. 5) and slide freely with respect thereto.

The third beam 54 is also a tubular member and has outside dimensions which allow it to slide into the hollow interior of second beam 50. Front mounting bracket 18 is secured to the distal end of third beam 54 by bolts 56 or other appropriate fastening means. An inverted U-shaped fitting 58 is bolted over the distal end of third beam 54, and a locking stud 60 extends downwardly through aligned holes in fitting 58 and beam 54. Slide blocks 62 are secured to the lower ends of fitting 58 and have beveled lower surfaces which bear slidingly against beveled edges 36 of floor plate 28 (see FIG. 6).

Locking stud 60 has a knob 64 at its upper end and a flange 66 at its lower end. Flange 66 is sized to engage stud receiving holes 38 formed in track 30 and also stop hole 40 at the end of base plate 12. As seen in FIG. 6, a nut 68 is secured to a threaded portion of locking stud 60 between the upper surface of third beam 54 and the lower surface of fitting 58. A coil spring 70 is trapped between the top of nut 68 and the inner surface of fitting 58 to bias locking stud 60 to a downwardly extended position.

A stop bolt 72 passes through the end of track 30 adjacent the midportion of floor plate 28. Stop bolt 72 blocks the end of track race 32 so that track engagement member 48 on the bottom of first beam 42 is prevented from sliding out of engagement with track 30.

Anchor 10 is bolted or otherwise secured to the floor of a vehicle such that track plate 12 extends generally perpendicular to the direction of vehicle travel and the first end 12a of track plate 12 is preferably adjacent a side wall of the vehicle. When anchor 10 is not in use, first, second and third beams 42,50,54 are moved to their retracted positions wherein first beam 42 is slid fully to the first end 12a of track plate 12 and the second and third beams 50,54 are telescoped down within first beam 42 to assume a minimum length condition (see FIG. 1). Locking stud 60 engages one of holes 38 in track 30 to maintain beam assembly 14 in the retracted position. In this retracted position, wheelchairs may be easily moved into position in front and/or behind anchor 10. Also, anchor 10 obstructs a minimum amount of space within the vehicle when in the retracted position so that non-wheelchair passengers may be carried. For example, a fold-down seat (not shown) may extend along a wall of the vehicle and be movable between a vertical position flush with the wall when wheelchairs are carried and a horizontal position wherein it extends over the retracted beam assembly 14 to accept seated passengers.

Once a wheelchair has been moved into position in front of and/or behind anchor 10, locking stud 60 is disengaged from floor plate 28 by pulling upward on knob 64, and beam assembly 14 is slid to its fully extended position by drawing third beam 54 toward the second end of floor plate 28. Locking stud knob 64 is then released so that spring 70 urges flange 66 downwardly into stop hole 40 at the end of floor plate 28. In the extended position, front mounting brackets 16,18 are spaced from one another by a distance proper for anchoring restraint straps (not shown) extending to the front of a first wheelchair positioned behind anchor 10. Rear mounting brackets 20,22 are spaced from one another by a distance proper for anchoring restraint straps extending to the rear of a second wheelchair positioned in front of anchor 10.

When beam assembly 14 is in the extended position, both of its ends are engaged with track plate 12. Accordingly, loads applied to the beam assembly by the wheelchair straps are transferred to the track plate at both of the attachment points and the beam assembly acts as a simply-supported beam. This allows beam assembly 14 to be made of lighter, less stiff sections than would be the case for a beam that is attached to floor plate 28 at only one end and so acts as a cantilever beam when loaded.

The three-element telescoping beam design allows for a minimum retracted length while still positioning the front and rear mounting brackets at correct positions for attachment to wheelchairs when in the extended position. The spacing between rear mounting brackets 20,22 may be adjusted by loosening bolts 46, sliding the brackets individually along the length of their respective beams to the desired positions, and re-tightening the bolts. Adjustment of the mounting bracket positions may be desirable to match different models and sizes of wheelchairs.

Beam assembly 14 may be removed from connection with track plate 12 by removing stop bolt 72 and sliding the beam assembly 14 toward the second end of track plate until first beam 42 slides completely out of engagement with track race 32. This may be desirable to allow cleaning of the vehicle or when wheelchairs are not to be carried in the vehicle for a considerable time. Also, the layout of the vehicle may be modified by switching one or more beam assemblies between several track plates that are attached to the vehicle floor in different locations.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An anchor for securing a wheelchair within a vehicle, the anchor comprising:

an elongated plate securable to the floor of a vehicle and having a longitudinal axis; and a beam assembly comprising:

a first beam slidingly engaged with the plate for movement along the longitudinal axis between a retracted position adjacent a first end of the plate and an extended position wherein the first beam is slid toward a second end of the plate, the first beam having a first mounting bracket disposed adjacent a first end thereof;

a second beam slidingly engaged with the first beam for movement along the longitudinal axis between a retracted position and an extended position relative to the first beam; and a third beam slidingly engaged with the second beam for movement along the longitudinal axis between a retracted position relative to the second beam and an extended position relative to the second beam, the third beam having a second mounting bracket disposed adjacent a distal end thereof;

the distal end of the third beam securable to the plate at a first location adjacent a midportion of the plate to maintain the first, second and third beams in their respective retracted positions adjacent the first end of the plate, and the distal end of the third beam alternatively securable to the plate at a second location adjacent the second end of the plate to maintain the first, second and third beams in their respective extended positions wherein the first and second mounting brackets are spaced from one another to allow connection with wheelchair restraint straps.

2. The anchor according to claim 1 wherein the beam assembly is removable from the plate.

3. The anchor according to claim 1 further comprising a third mounting bracket disposed on the first beam and a fourth mounting bracket disposed on the second beam.

4. The anchor according to claim 3 wherein the third and fourth mounting brackets are secured to the first beam and the second beam respectively for adjustable movement along the longitudinal axis.

5. The anchor according to claim 4 wherein at least one of the beams has a channel extending longitudinally along at least one side thereof for slidingly receiving at least one of the mounting brackets.

6. The anchor according to claim 1 wherein the distal end of the third beam is securable to the plate by a retractable pin disposed adjacent the distal end of the third beam and removably engageable with holes at the first and second locations.

7. The anchor according to claim 1 further comprising a track engagement member disposed on a lower surface of the first beam and engaged with a track disposed on an upper surface of the plate to permit said sliding engagement between the first beam and the plate.

8. The anchor according to claim 1 wherein the third beam slides into a hollow interior of the second beam.

9. The anchor according to claim 1 wherein the second beam slides into a hollow interior of the first beam.

10. An anchor for securing a wheelchair within a vehicle, the anchor comprising:

an elongated plate securable to the floor of a vehicle and having a longitudinal axis;

a first beam slidingly engaged with the plate for movement along the longitudinal axis between a retracted position adjacent a first end of the plate and an extended position wherein the first beam is slid toward a second end of the plate, the first beam having a first mounting bracket disposed adjacent a first end thereof;

a second beam slidingly engaged with the first beam for movement along the longitudinal axis between a retracted position relative to the first beam and an extended position relative to the first beam; and a third beam slidingly engaged with the second beam for movement along the longitudinal axis between a retracted position relative to the second beam and an extended position relative to the second beam, the third beam having a second mounting bracket disposed adjacent a distal end thereof, the distal end securable to the plate at a first location adjacent a midportion of the plate to maintain the first, second and third beams in their respective retracted positions adjacent the first end of the plate, and the distal end alternatively securable to the plate at a second location adjacent the second end of the plate to maintain the first, second and third beams in their respective extended positions wherein the first and second mounting brackets are spaced from one another to allow connection with wheelchair restraint straps.

11. The anchor according to claim 10 wherein the first, second and third beams are removable as an assembly from the plate.

12. The anchor according to claim 10 further comprising a third mounting bracket disposed on the first beam and a fourth mounting bracket disposed on the second beam.

13. The anchor according to claim 12 wherein the third and fourth mounting brackets are secured to the first beam and the second beam respectively for adjustable movement along the longitudinal axis.

14. The anchor according to claim 13 wherein at least one of the beams has a channel extending longitudinally along at least one side thereof for slidingly receiving at least one of the mounting brackets.

15. The anchor according to claim 10 wherein the distal end of the third beam is securable to the plate by a retractable pin disposed adjacent the distal end of the third beam and removably engageable with holes at the first and second locations.

16. The anchor according to claim 10 further comprising a track engagement member disposed on a lower surface of the first beam and engaged with a track disposed on an upper surface of the plate to permit said sliding engagement between the first beam and the plate.

17. The anchor according to claim 10 wherein the third beam slides into a hollow interior of the second beam.

18. The anchor according to claim 10 wherein the second beam slides into a hollow interior of the first beam.

* * * * *